(12) United States Patent
Romner et al.

(10) Patent No.: US 12,436,589 B2
(45) Date of Patent: Oct. 7, 2025

(54) SYSTEM AND METHOD FOR PROVIDING INCREASED POWER USING POWER OVER ETHERNET

(71) Applicant: Axis AB, Lund (SE)

(72) Inventors: Marcus Romner, Lund (SE); Claes Ingvert, Lund (SE)

(73) Assignee: AXIS AB, Lund (SE)

( * ) Notice: Subject to any disclaimer, the term of this patent is extended or adjusted under 35 U.S.C. 154(b) by 49 days.

(21) Appl. No.: 18/605,991

(22) Filed: Mar. 15, 2024

(65) Prior Publication Data
US 2024/0333540 A1 Oct. 3, 2024

(30) Foreign Application Priority Data

Mar. 29, 2023 (EP) ..................................... 23164873

(51) Int. Cl.
| | | |
|---|---|---|
| *G06F 1/26* | (2006.01) | |
| *H04L 12/10* | (2006.01) | |
| *H04L 25/02* | (2006.01) | |

(52) U.S. Cl.
CPC ............... *G06F 1/266* (2013.01); *H04L 12/10* (2013.01); *H04L 25/02* (2013.01)

(58) Field of Classification Search
CPC .......... G06F 1/266; G06F 1/28; G06F 1/3206; G06F 1/3209; H04L 12/10; H04L 25/02; H04B 3/54
See application file for complete search history.

(56) References Cited

U.S. PATENT DOCUMENTS 10,734,140 B1 * 8/2020 Hastings ................. H03M 1/38
11,114,936 B2 * 9/2021 Patel ....................... G06F 1/266
(Continued)

FOREIGN PATENT DOCUMENTS

CN 105259965 A 11/2017
CN 106161041 A 7/2019

OTHER PUBLICATIONS

Chen, J., "Beyond BT High-Power PoE Solution using the TPS-23880 and TPS2372-4" Texas Instruments Application Report, Dallas, TX, (2018).
(Continued)

*Primary Examiner* — Thomas J. Cleary
(74) *Attorney, Agent, or Firm* — Volpe Koenig (57) ABSTRACT

A method for controlling the output power of power sourcing equipment powering a device through an ethernet cable, comprising: performing a power negotiation between the power sourcing equipment and the powered device, the negotiation comprising establishing a relation between an output voltage of the power sourcing equipment and a loop current from the powered device to the power sourcing equipment by measuring the loop current in a current-sensing device; obtaining indications of whether the powered device needs increased power and whether the power sourcing equipment is able to deliver increased power; if the powered device needs increased power and the power sourcing equipment is of a power sourcing equipment type able to deliver increased power, physically manipulating the current-sensing device such that it senses a manipulated lower loop current; and providing a manipulated higher output power from the power sourcing equipment to the powered device.

10 Claims, 3 Drawing Sheets

(56) References Cited

U.S. PATENT DOCUMENTS

| | | |
|---|---|---|
| 2007/0220280 A1 | 9/2007 | Karam et al. |
| 2007/0284946 A1* | 12/2007 | Robbins .................... H02J 1/10 |
| | | 307/18 |
| 2013/0076133 A1* | 3/2013 | Gammel ............ H03K 17/0822 |
| | | 327/109 |
| 2013/0339760 A1 | 12/2013 | Zimmerman et al. |
| 2014/0229747 A1 | 8/2014 | Jain et al. |
| 2017/0115719 A1 | 4/2017 | Hunter, Jr. et al. |
| 2019/0179389 A1* | 6/2019 | Frick .......................... G06F 1/28 |
| 2021/0247949 A1* | 8/2021 | Siu .......................... H04R 1/025 |
| 2021/0258177 A1 | 8/2021 | Wolff |

OTHER PUBLICATIONS

Extended European Search Report issued on Aug. 7, 2023 for European Patent Application No. 23164873.4.

Yseboodt, L., "Overview of 802.3bt—Power over Ethernet standard", (2018).

* cited by examiner

SYSTEM AND METHOD FOR PROVIDING INCREASED POWER USING POWER OVER ETHERNET

The present disclosure relates to a method of controlling an output power of a power sourcing equipment to a powered device through one or more ethernet cables. By using the method, power greater than the power stipulated by the standard can be provided. The disclosure further relates to a power sourcing equipment as well as a system comprising the power sourcing equipment.

BACKGROUND

Power over Ethernet (POE) describes standards that pass electric power along with data on twisted-pair ethernet cabling. This allows a single cable to provide both data connection and electrical power to devices such as Internet Protocol (IP) cameras. The PoE connection thereby eliminates the need for a nearby power outlet. There are several techniques for transmitting power over ethernet cabling. Some of them have been standardized by the Institute of Electrical and Electronics Engineers (IEEE).

The IEEE PoE standards provide for signaling between the power source and the powered device. "Power sourcing equipment" (PSE) and "powered device" (PD) are standard terms known from the PoE standards. A power sourcing equipment, such as a midspan, enables an existing network to support PoE. The power sourcing equipment, which adds power to the ethernet cable, is placed between a network switch and powered devices. The signaling between the power sourcing equipment and the powered device allows the presence of a conformant device to be detected by the power sourcing equipment and allows the powered device and power sourcing equipment to negotiate the amount of power required or available.

One example of a standard is the IEEE 802.3bt standard, according to which the output power from the power sourcing equipment is limited to 90 W. For certain devices, however, this power may not be sufficient, or may not be sufficient for certain modes or certain conditions in which the device operates. For the example of an IP camera, for example, a Pan Tilt Zoom (PTZ) camera, the camera may need more than 90 W, for example, if the weather is cold. In this case it may be possible to add a further external power supply. However, this solution is not ideal since it requires additional hardware as well as a power cable.

SUMMARY

The present disclosure relates to a method and system for providing increased power over a power over ethernet connection i.e. a connection providing both a data connection and electrical power. The method and systems are based on a manipulation of the functioning of a power sourcing equipment to provide an increased power. "Increased power" refers to a power greater than a power that the power sourcing equipment is limited to according to a given standard, for example, the IEEE 802.3bt standard. Other examples of IEEE standards are the 802.3af standard and the 802.3at. A standard is typically limited to a maximum output effect. The power sourcing equipment needs to be backward compatible with existing PoE solution and existing standards. For this reason, it is not possible to, for example, merely use a higher output power. The power sourcing equipment may be, for example, a power over ethernet midspan or a power over ethernet switch.

The present disclosure relates to, according to a first embodiment, a method of controlling an output power of a power sourcing equipment to a powered device through one or more ethernet cables, the method comprising:
performing a power negotiation between the power sourcing equipment and the powered device, the power negotiation comprising establishing a relation between an output voltage of the power sourcing equipment and a loop current from the powered device to the power sourcing equipment by measuring the loop current in a current-sensing device;
obtaining indications of whether the powered device needs increased power and whether the power sourcing equipment is of a power sourcing equipment type able to deliver increased power;
if the powered device needs increased power and the power sourcing equipment is of a power sourcing equipment type able to deliver increased power, physically manipulating the current-sensing device such that it senses a manipulated lower loop current; and
providing a manipulated higher output power from the power sourcing equipment to the powered device.

The power negotiation can be seen as a conventional power negotiation between the power sourcing equipment and the powered device.

When the conventional power negotiation has been done, a second negotiation between the power sourcing equipment and the powered device may be carried out. The second negotiation may be done through software-based communication, possibly over the one or more ethernet cables. The step of obtaining indications of whether the powered device needs increased power and of whether the power sourcing equipment is of a power sourcing equipment type able to deliver increased power may be initiated by the powered device or by the power sourcing equipment. Accordingly, the step of obtaining indications of whether the powered device needs increased power and of whether the power sourcing equipment is of a power sourcing equipment type able to deliver increased power may comprise:
obtaining a request from the powered device that it needs increased power and an acknowledgment from the power sourcing equipment that it is of a power sourcing equipment type able to deliver the increased power
or
obtaining an offer from the power sourcing equipment to provide increased power and an accept from the powered device to receive the increased power.

Thus, the start of such a power negotiation may be that the powered device requests increased power. A further option is that the power sourcing equipment initiates the process by transmitting information indicating that it has the capability of providing increased power. The powered device can then request or confirm that it needs increased power. If the powered device has requested increased power and the power sourcing equipment is of a type that can deliver it, the current-sensing device may be manipulated such that it senses a manipulated lower loop current. This can be done in several ways. In one embodiment, the step of performing the power negotiation comprises measuring the loop current using a first shunt resistance, and the step of physically manipulating the current-sensing device comprises activating a manipulation shunt resistance in the power sourcing equipment, wherein the manipulation shunt resistance has a lower resistance than the first shunt resistance. According to one embodiment, a manipulation shunt resistance may be activated in the power sourcing equipment. The manipulation shunt resistance has a lower resistance than the first shunt resistance. The manipulation shunt resistance can be implemented in several ways. For example, the manipulation shunt resistance may comprise a manipulation shunt resistor, which is connected in parallel to a first shunt resistor. This can be done by closing a switch to the manipulation shunt resistor. A further possibility is to have two serially connected resistors constituting the first shunt resistance. The manipulation shunt resistance may then use only one of the resistors in order to provide a total lower manipulation shunt resistance. The idea of the manipulation shunt resistance is to manipulate the power sourcing equipment to deliver an increased power. If the resistance is lower, it will appear to the power sourcing equipment that it uses less power than it actually does. It may therefore provide the increased power without further changes. A further option for manipulation of the current-sensing device is measuring the loop current using an inductive circuit and a Hall sensor, wherein the step of physically manipulating the current-sensing device comprises manipulating the inductive circuit and/or the Hall sensor. This can be done, for example, by increasing a number of windings in the inductive circuit during manipulation, such that it senses a manipulated lower loop current. Accordingly, in one embodiment of the presently disclosed method, the step of performing the power negotiation comprises measuring the loop current using an inductive circuit and a Hall sensor, and wherein the step of physically manipulating the current-sensing device comprises manipulating the inductive circuit and/or the Hall sensor, such as by increasing a number of windings in the inductive circuit.

Figure 4A:
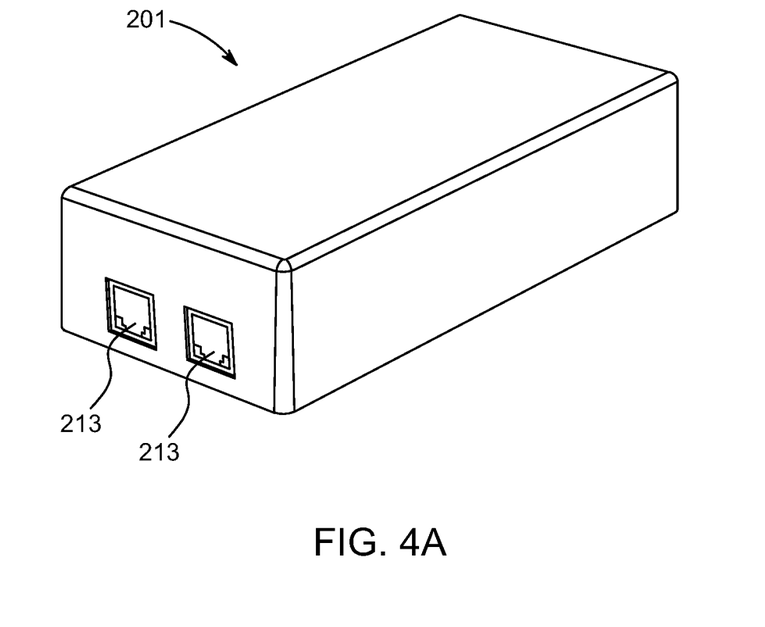
FIGS. 4A and 4B show an example of power over ethernet midspan having an AC input connector and two ethernet sockets.
Figure 4B:
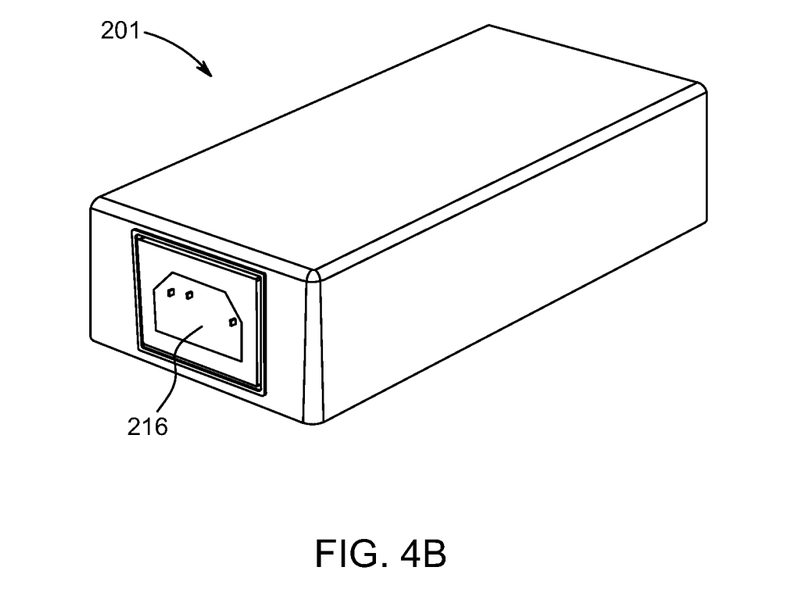

One advantage of the presently disclosed power sourcing equipment is that it is backward compatible. The physical manipulation of the current-sensing device is only done if the powered device has requested increased power and the power sourcing equipment is of a type that can deliver it. A power sourcing equipment is typically a small device that has a standard AC input connector, for example in the range of 100-240V. Some power sourcing equipment are also adapted to handle DC input. It is also a possibility that the power sourcing equipment has a lower input voltage, which is internally boosted. The device typically further comprises ethernet sockets, such as RJ45 sockets, to which ethernet cables can be plugged. FIG. 4 shows an example of a power of ethernet midspan. The presently disclosed power sourcing equipment may replace a conventional power sourcing equipment. From the outside there is no difference, and the midspan is fully compatible with existing PoE systems, but it can also support products (powered devices) that use power exceeding the limitations of the IEEE PoE standards, such as the 802.3bt standard.

The present disclosure further relates to a power sourcing equipment, comprising:
- a power over ethernet manager module for powering a powered device, based on an input power, through one or more ethernet cables;
- a measurement unit for, directly or indirectly, measuring an output voltage of the power sourcing equipment;
- a current-sensing device for measuring a loop current from a powered device to the power sourcing equipment;
- a processing unit configured to:
  perform a power negotiation between the power sourcing equipment device and the powered device, the power negotiation comprising establishing a relation between the output voltage of the power sourcing equipment and the first loop current;
  obtaining indications of whether the powered device needs increased power and of whether the power sourcing equipment is of a power sourcing equipment type able to deliver increased power;
  physically manipulating the current-sensing device such that it senses a manipulated lower loop current;
  wherein the power sourcing equipment is configured to provide a manipulated higher output power from the power sourcing equipment to the powered device if the powered device needs increased power and the power sourcing equipment is of a power sourcing equipment type able to deliver increased power.

A person skilled in the art will recognize that the presently disclosed method of controlling an output power of a power sourcing equipment to a powered device through one or more ethernet cables may be performed using any embodiment of the presently disclosed power sourcing equipment, and vice versa.

BRIEF DESCRIPTION OF DRAWINGS

Various embodiments are described hereinafter with reference to the drawings. The drawings are examples of embodiments and are intended to illustrate some of the features of the presently disclosed method and system for providing increased power over a power over ethernet connection, and are not limiting to the presently disclosed method and system.

DETAILED DESCRIPTION

The present disclosure relates to a method of controlling an output power of a power sourcing equipment to a powered device through one or more ethernet cables. Alternatively, the method may be seen as a method of providing increased power from a power sourcing equipment to a powered device using one or more ethernet cables.

The method is, preferably, a computer-implemented method. Preferably, a power negotiation is carried out between the power sourcing equipment and the powered device, the first power negotiation comprising establishing a relation between an output voltage of the power sourcing equipment and a loop current from the powered device to the power sourcing equipment by measuring the loop current in a current-sensing device. The power negotiation may be any PoE power negotiation for any PoE standard. Examples and further details are provided below. The method may further comprise the step of obtaining an indication that the powered device needs increased power. If the power sourcing equipment acknowledges being of a power sourcing equipment type able to deliver increased power, the method may physically manipulate a current-sensing device such that it senses a manipulated lower loop current, for example, by activating a manipulation shunt resistance in the power sourcing equipment, wherein the manipulation shunt resistance has a lower resistance than the first shunt resistance. Due to the manipulation, the power sourcing equipment may then provide a manipulated higher output power from the power sourcing equipment to the powered device.

Figure 1:
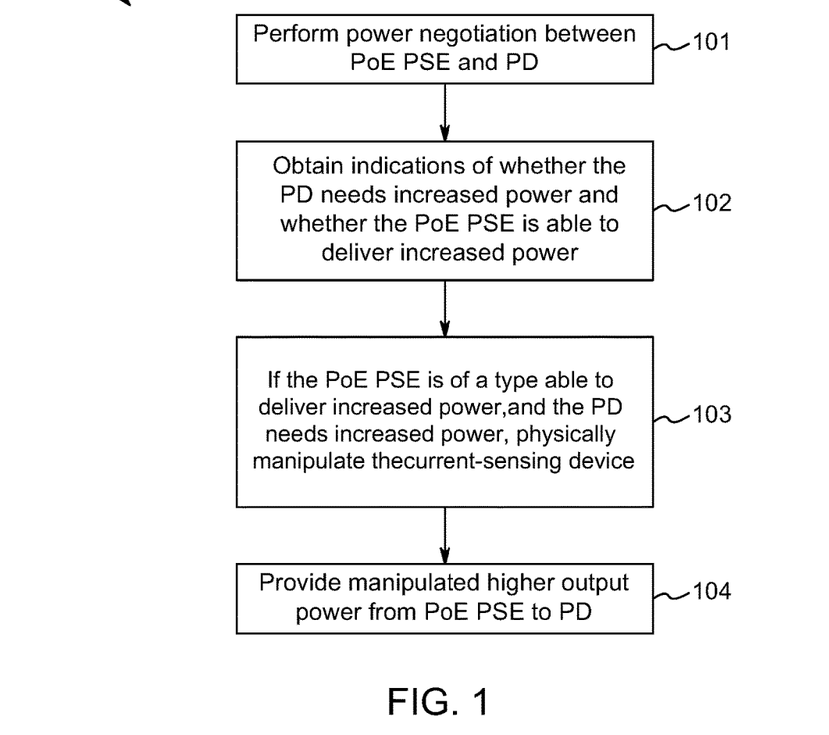
FIG. 1 shows a flow chart of a method according to an embodiment of the presently disclosed method of controlling an output power of a power sourcing equipment to a powered device through one or more ethernet cables.

FIG. 1 shows a flow chart of a method according to an embodiment of the presently disclosed method of controlling an output power of a power sourcing equipment to a powered device through one or more ethernet cables (100). The method comprises the steps of: performing a power negotiation between the power sourcing equipment and the powered device (101); obtaining an indication of whether the powered device needs increased power and whether the power sourcing equipment is able to deliver increased power (102); if the power sourcing equipment is of a power sourcing equipment type able to deliver increased power, physically manipulate a current-sensing device such that it senses a manipulated lower loop current (103); and providing a manipulated higher output power from the power sourcing equipment to the powered device (104).

As stated a "power sourcing equipment" enables an existing network to support PoE. For example, a midspan, which adds power to the ethernet cable, may be placed between a network switch and powered devices. The power sourcing equipment typically has an AC input connector, supporting input voltages, for example, in the range of 100-240V. Inside the power sourcing equipment there is typically, but not necessarily, an AC/DC converter and a PoE manager module that implements output voltage control, support for functions specified in standards, including detection, classification, power negotiation etc. A person skilled in the art would, generally, be familiar with such standard implementations of a power sourcing equipment. There are a number PoE manager modules commercially available on the market. The presently disclosed power sourcing equipment may comprise at least one first shunt resistance and a measurement unit for, directly or indirectly, measuring a) an output voltage of the power sourcing equipment to the powered device, b) a loop current from a powered device to the power sourcing equipment through the at least one first shunt resistance, and c) the loop current from the powered device through a manipulation shunt resistance. Measuring voltages and currents directly or indirectly shall be construed broadly to cover any measurements that provide the power used by the powered device. As an example, if one measures a voltage over a known resistance, one also knows the current. Similarly, if one knows the resistance, the voltage and the current of a component, one also knows the power being consumed. As stated above, there are different embodiments and implementations of the first shunt resistance and the manipulation shunt resistance. A current-sensing device does not necessarily have to be implemented using shunt resistance. It can also be implemented using, for example, an inductive circuit and a Hall sensor.

The first shunt resistance, which may typically be implemented as one or more shunt resistors, or other components used in the current-sensing device, may be used in a power negotiation between the power sourcing equipment and the powered device, the power negotiation comprising establishing a relation between an output voltage of the power sourcing equipment and a loop current from the powered device to the power sourcing equipment through a first shunt resistance in the power sourcing equipment. PoE negotiation is the process of determining if and how much power should be provided to a device over the ethernet cable. This is typically done through a special signalling protocol between the power source and the powered device. If both the power source and the powered device support the same PoE standard, then they can negotiate to provide the PD with up to the maximum amount of power specified by that standard. The negotiation may comprise discovery, classification and operation. In the present disclosure, the reference to "increased" power refers to a power greater than a power intended to be used by the power sourcing equipment operating in a given PoE standard. The power intended to be used by the power sourcing equipment operating in a given PoE standard may be referred to as a nominal power. As an example, the IEEE 802.3bt standard is limited to 90 W. This does not necessarily mean that the power of ethernet manager module is not capable of providing more than 90 W. In this case the increased power means that power sourcing equipment shall be manipulated to provide a power greater than 90 W, such as at least 120 W. In one embodiment the power sourcing equipment is manipulated to provide a maximum average power of around 180 W. The power sourcing equipment may support, for example, a peak power of 200 W. In one embodiment of the presently disclosed method and system, the power sourcing equipment, according to a power of ethernet standard under which it operates, is limited to deliver a maximum average output power of 90 W, wherein the power sourcing equipment is manipulated to deliver a manipulated average output power higher than 90 W, such as 120 W or 180 W.

The power negotiation can be seen as a conventional power negotiation between the power sourcing equipment and the powered device. A power negotiation may comprise a process in which the PD requests a certain amount of power, and the PSE assigns that power or less. The power negotiation may comprise classification and may involve a sequence of steps and events that would be known to the person skilled in the art. Physical layer detection may be performed before operating voltage is applied. In this process a series of events is carried out during which the PSE applies a voltage level to which the PD responds with a certain predetermined current draw.

Physical Layer classification is performed after detection, but before operating voltage is applied. It consists of a series of class events during which the PSE applies a voltage level to which the PD responds with a certain predetermined current draw.

For example, as part of the power negotiating process, a fixed output power may be maintained while a loop current from the powered device is measured. In a second step the resistance in the powered device may then be varied in one or more steps. For each resistance, the loop current is measured one or more times. By means of example, the resistance may be changed one time, and the loop current may be measured five times (two times for a first resistance and three times for a second resistance). At the end of the power negotiation the system can determine what power that can be provided to the powered device. As a person skilled in the art would understand, the standard power negotiation is a fully known procedure. Deviations are possible. Further details about power negotiation can be found directly in standards, such as the IEEE 802.3bt standard, or in overviews, such as in an overview by the Ethernet Alliance (for example "Overview of 802.3bt—Power over Ethernet standard", Yseboodt et al, 2018).

As part of the negotiation process, a first reference voltage may be applied, upon which the output voltage is maintained and a loop current is measured. A second reference voltage is applied and a number of test resistances are sequentially enabled in the powered device, where the loop current for each test resistance is measured.

Figure 2:
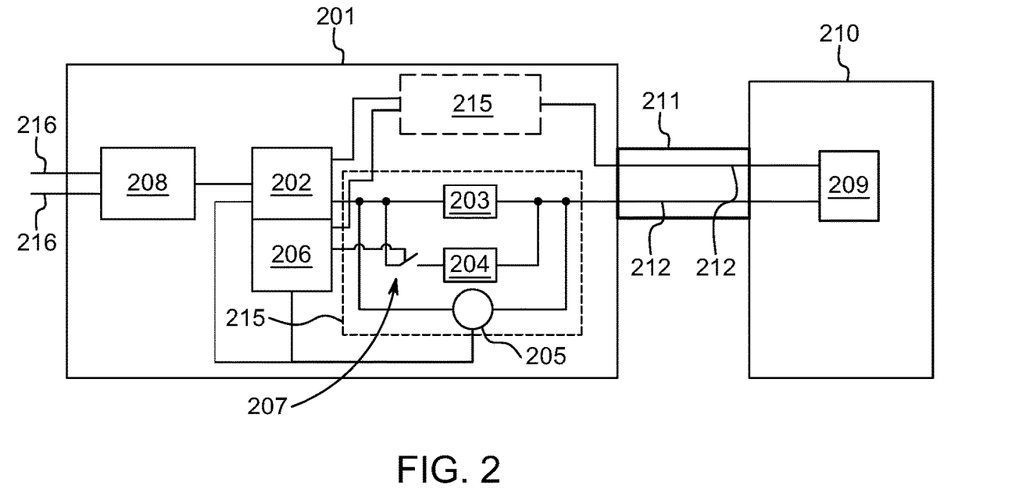
FIG. 2 shows a schematic view of an embodiment of the presently disclosed power sourcing equipment with an ethernet cable and a powered device.

FIG. 2 shows an embodiment of the presently disclosed power sourcing equipment 201 with a powered device system 210 comprising a powered device 209. The powered device system 210 may comprise a plurality of powered devices 209. The power sourcing equipment 201 and the powered device system 210 are connected using one or more ethernet cables 211. In FIG. 2 the ethernet cable 211 is exemplified with two PoE pairs 212. Each PoE pair may comprise a number of wires. More generally, the ethernet cable 211 may have any suitable number of electrical wires. The power sourcing equipment 201 comprises a power of ethernet manager module (202) for powering the powered device 209. The power sourcing equipment 201 may typically have an AC input 216 and AC/DC converter 208. In FIG. 2 the power of ethernet manager module 202 and a processing unit 206, such as a microcontroller, have been illustrated as two different units, but may be integrated into a single solution. The power sourcing equipment 201 in the example of FIG. 2 comprises a measurement unit 205 for measuring the voltage over the first shunt resistor 203, or over the first shunt resistor 203 and the manipulation shunt resistor 204 in case the switch 207 connects the manipulation shunt resistor 204. The measurement unit 205 does not have to be a separate entity. It may be part of, for example, the power of ethernet manager module 202. The measurement unit 205, or another measurement unit, may also be configured to measure the output voltage on any wire being part of the PoE pairs 212 to the powered device 209. The measurement unit 205, the first shunt resistor 203 and the manipulation shunt resistor 204 represent a current-sensing device 215 in this embodiment. As can be seen, the upper PoE pair 212 may have a further parallel current-sensing device 215.

In the example of FIG. 2 the first shunt resistor 203 constitutes a first shunt resistance. When the switch 207 is connected, the manipulation shunt resistor 204 is connected in parallel to the first shunt resistor 203, thereby providing a total manipulation shunt resistance having a lower resistance than the first shunt resistance. As would be understood by a person skilled in the art, the first shunt resistance and the manipulation shunt resistance do not necessarily have to be implemented using two resistors connected in parallel. It would be possible, for example, to disconnect the first shunt resistor 203 and switch to use a manipulation shunt resistor 204 having a lower resistance, instead of the first shunt resistor 203, when providing the increased power.

According to one embodiment of the method and system for providing increased power over a power over ethernet connection, the step of activating the manipulation shunt resistance comprises closing a switch to a manipulation shunt resistor.

After the power negotiating has been done, the power sourcing equipment and the powered device may continue the communication. This communication may be implemented in software, hardware or a combination. Hence, the request for increased power and indication may be obtained from the power device through software-based communication and/or through communication via the one or more ethernet cables. Irrespective of the implementation of such a communication interface, the powered device needs to indicate in some way that it needs increased power. The process can be initiated by the power sourcing equipment or by the powered device. For example, the powered device may be a device, for example a camera, that needs more than 90 W when the weather is cold. The power sourcing equipment also needs to indicate that it is of a type being able to deliver increased power. According to one embodiment, the power sourcing equipment delivers a non-manipulated output power if the powered device does not indicate that the powered device is of a type requiring additional power, whereas the power sourcing equipment delivers the manipulated output power if the powered device indicates that the powered device is of a type requiring additional power.

Preferably, the power sourcing equipment is, as a minimum, compliant with an IEEE PoE standard, such as an IEEE 802.3bt standard. The presently disclosed method and system for providing increased power over a power over ethernet connection are, however, not limited to IEEE 802.3bt standard. It may be applied to any PoE standard having a maximum output power. Accordingly, the presently disclosed power sourcing equipment may be manipulated to deliver a manipulated output power greater than 90 W, or greater than 120 W, or greater than 180 W.

The presently disclosed method may further comprise a second power negotiation performed after the first power negotiation. The second power negotiation may be seen as a manipulated power negotiation that follows after the conventional power negotiation, and which is part of the process of proving an increased output power.

Figure 3:
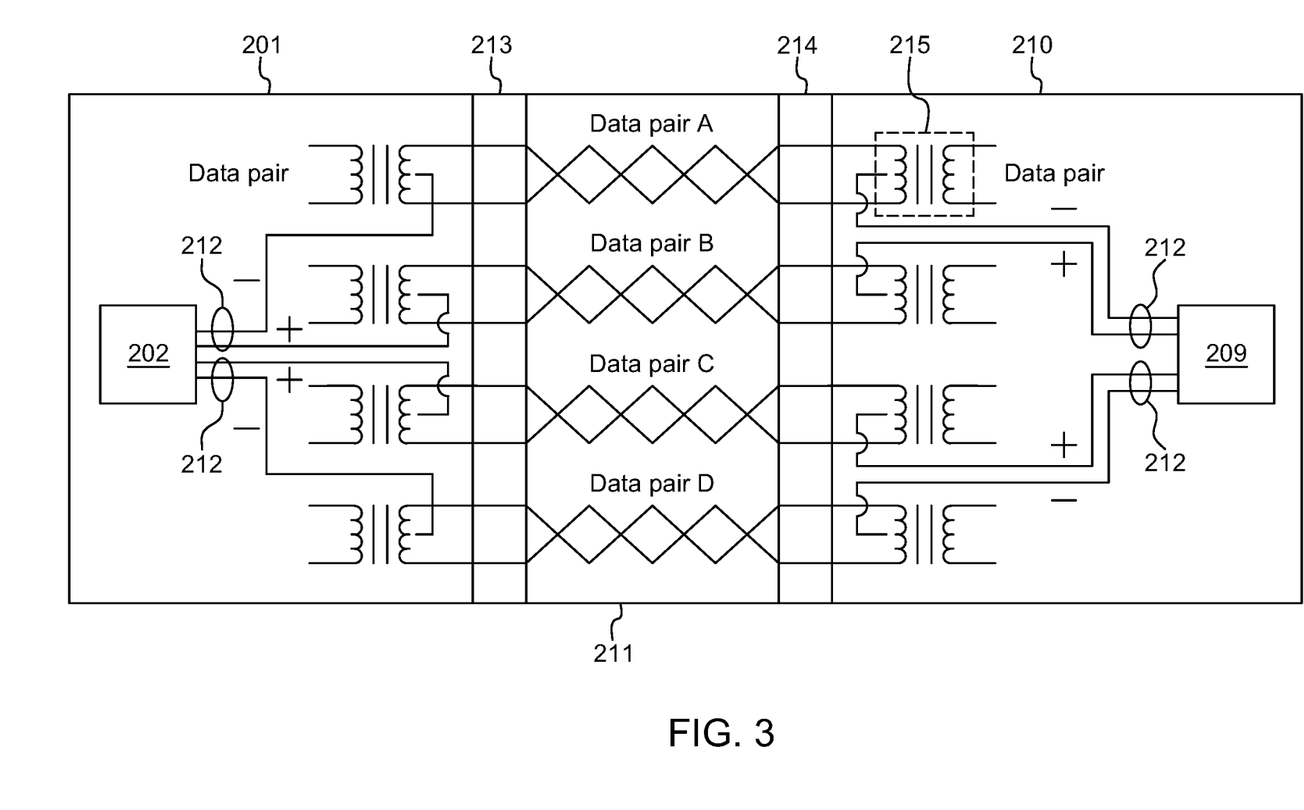
FIG. 3 shows an example of a power configuration of a PoE solution having an ethernet cable with 8 pins and 8 wires.

The idea described in the present disclosure regards providing manipulated higher output power from the power sourcing equipment to the powered device. This means that the increased power is fed from the power sourcing equipment to a powered device through one or more power over ethernet conductor pairs. FIG. 3 shows an example of a power configuration of a PoE solution having an ethernet cable with 8 pins and 8 wires. FIG. 3 shows a power sourcing equipment 201 connected to a powered device system 210 through an ethernet cable 211. The ethernet cable 211 comprises 4 pairs of electrical wires. There are thus 4 data pairs (A, B, C and D). Data pairs A and B form a PoE pair 212. Data pairs C and D form a further PoE pair 212. The power sourcing equipment 201 comprises a power of ethernet manager module 202. The powered device system 210 comprises a powered device 209. Both the power sourcing equipment 201 and the powered device system 210 have an ethernet socket 213/214 into which an ethernet cable 211 can be plugged. There are thus 4 data pairs (A, B, C and D) in the powered device system 210. The presently disclosed power sourcing equipment is not limited to any specific PoE technique or configuration. As a person skilled in the art will realize, any configuration of the wires is possible.

The present disclosure further relates to a computer program having instructions which, when executed by a computing device or computing system, cause the computing device or computing system to carry out any embodiment of the presently disclosed method of controlling an output power of a power sourcing equipment to a powered device through one or more ethernet cables. The computer program may be stored on any suitable type of storage media, such as non-transitory storage media.

The present disclosure further relates to a system comprising a power sourcing equipment and a powered device. The powered device may comprise at least one camera, LIDAR, speaker or radar. In case of a camera, the at least one camera may be any camera, but specifically one or more PTZ cameras. The power sourcing equipment preferably comprises:
 a power over ethernet manager module for powering a powered device, based on an input power, through one or more ethernet cables;
 a measurement unit for, directly or indirectly, measuring an output voltage of the power sourcing equipment;

a current-sensing device for measuring a loop current from a powered device to the power sourcing equipment;

a processing unit configured to:

perform a power negotiation between the power sourcing equipment device and the powered device, the power negotiation comprising establishing a relation between the output voltage of the power sourcing equipment and the first loop current;

obtaining indications of whether the powered device needs increased power and of whether the power sourcing equipment is of a power sourcing equipment type able to deliver increased power;

physically manipulating the current-sensing device such that it senses a manipulated lower loop current;

wherein the power sourcing equipment is configured to provide a manipulated higher output power from the power sourcing equipment to the powered device if the powered device needs increased power and the power sourcing equipment is of a power sourcing equipment type able to deliver increased power.

The power of ethernet manager module, the measurement unit and the processing unit may be partly or fully integrated, which means that they are not necessarily separate units.

As described above, measuring a loop current can be done directly or indirectly.

The at least one first shunt resistor may constitute a first shunt resistance. The first shunt resistance, however, does not have to be a single resistor. The at least one manipulation shunt resistor can then, alone or coupled parallel to the at least one first shunt resistor, constitute the manipulation shunt resistance. The manipulation shunt resistance shall have a lower resistance than the first shunt resistance. The power sourcing equipment may further comprise a switch element, wherein the switch element can be closed to connect to the manipulation shunt resistor when increased power is delivered, and wherein the switch element is open during the first power negotiation. When the switch element is closed, the loop current can run through the manipulation shunt resistor.

The power sourcing equipment and/or the system may further comprise peripheral components, such as one or more memories, which may be used for storing instructions that can be executed by any of the processors. The system may further comprise any of: internal and external network interfaces, input and/or output ports, a keyboard or mouse etc.

As would be understood by a person skilled in the art, a processing unit also may be a single processor in a multi-core/multiprocessor system. Both the computing hardware accelerator and the central processing unit may be connected to a data communication infrastructure.

The power sourcing equipment and/or the system may include a memory, such as a random access memory (RAM) and/or a read-only memory (ROM), or any suitable type of memory. The system may further comprise a communication interface that allows software and/or data to be transferred between the system and external devices. Software and/or data transferred via the communications interface may be in any suitable form of electric, optical or RF signals. The communications interface may comprise, for example, a cable or a wireless interface.

The invention claimed is:

1. A method for controlling an output power of a power sourcing equipment to a powered device, the power sourcing equipment and the powered device operating under a power over ethernet standard, through one or more ethernet cables, the method comprising:

performing a power negotiation between the power sourcing equipment and the powered device, the power negotiation comprising establishing a relation between an output voltage of the power sourcing equipment and a loop current from the powered device to the power sourcing equipment by measuring the loop current in a current-sensing device in the power sourcing equipment;

obtaining indications of whether the powered device needs increased power in relation to a maximum power intended to be used by the power sourcing equipment operating under the power over ethernet standard and whether the power sourcing equipment is of a power sourcing equipment type able to deliver increased power;

if the powered device needs increased power and the power sourcing equipment is of a power sourcing equipment type able to deliver increased power, physically manipulating the current-sensing device such that it senses a manipulated lower loop current; and providing a manipulated higher output power from the power sourcing equipment to the powered device, wherein the step of performing the power negotiation comprises measuring the loop current using a first shunt resistance or using an inductive circuit, and wherein the step of physically manipulating the current-sensing device comprises:

in case the loop current is measured using the first shunt resistance, activating a manipulation shunt resistance in the power sourcing equipment, wherein the manipulation shut resistance has a lower resistance than the first shunt resistance; and in case the loop current is measured using the inductive circuit, manipulating the inductive circuit by increasing a number of windings in the inductive circuit.

2. The method of claim 1, wherein the step of activating the manipulation shunt resistance comprises closing a switch to a manipulation shunt resistor.

3. The method of claim 1, wherein the step of obtaining indications of whether the powered device needs increased power and of whether the power sourcing equipment is of a power sourcing equipment type able to deliver increased power comprises:

obtaining a request from the powered device that it needs increased power and an acknowledgment from the power sourcing equipment that it is of a power sourcing equipment type able to deliver the increased power, or obtaining an offer from the power sourcing equipment to provide increased power and an accept from the powered device to receive the increased power.

4. The method of claim 1, wherein the power sourcing equipment delivers a non-manipulated output power if the powered device does not indicate that the powered device is of a type requiring additional power, and the power sourcing equipment delivers the manipulated output power if the powered device indicates that the powered device is of a type requiring additional power.

5. The method of claim 1, wherein the power sourcing equipment, according to a power of ethernet standard under which it operates, is limited to deliver a maximum average output power of 90 W, and wherein the power sourcing equipment is manipulated to deliver a manipulated average output power higher than 90 W, such as 120 W.

6. The method of claim 1, wherein the indication of whether the powered device needs increased power is obtained from the power device through software-based communication and/or through communication via the one or more ethernet cables.

7. A non-transitory computer readable medium containing a computer program having instructions which, when executed by a computing device or computing system, cause the computing device or computing system to carry out a method, the method comprising:

performing a power negotiation between the power sourcing equipment and the powered device, the power negotiation comprising establishing a relation between an output voltage of the power sourcing equipment and a loop current from the powered device to the power sourcing equipment by measuring the loop current in a current-sensing device in the power sourcing equipment;

obtaining indications of whether the powered device needs increased power in relation to a maximum power intended to be used by the power sourcing equipment operating under the power over ethernet standard and whether the power sourcing equipment is of a power sourcing equipment type able to deliver increased power;

if the powered device needs increased power and the power sourcing equipment is of a power sourcing equipment type able to deliver increased power, physically manipulating the current-sensing device such that it senses a manipulated lower loop current; and providing a manipulated higher output power from the power sourcing equipment to the powered device, wherein the step of performing the power negotiation comprises measuring the loop current using a first shunt resistance or using an inductive circuit, and wherein the step of physically manipulating the current-sensing device comprises:

in case the loop current is measured using the first shunt resistance, activating a manipulation shunt resistance in the power sourcing equipment, wherein the manipulation shut resistance has a lower resistance than the first shunt resistance; and in case the loop current is measured using the inductive circuit, manipulating the inductive circuit by increasing a number of windings in the inductive circuit.

8. A power sourcing equipment, comprising:
a power over ethernet manager module for powering a powered device, based on an input power, through one or more ethernet cables;
a measurement unit for, directly or indirectly, measuring an output voltage of the power sourcing equipment;
a current-sensing device for measuring a loop current from the powered device to the power sourcing equipment;
at least one first shunt resistance and at least one manipulation shunt resistance having a lower resistance than the first shunt resistance, or an inductive circuit; and
a processing unit configured to:
perform a power negotiation between the power sourcing equipment device and the powered device, the power negotiation comprising establishing a relation between the output voltage of the power sourcing equipment and the loop current, comprising measuring the loop current using the first shunt resistance or using the inductive circuit;
obtaining indications of whether the powered device needs increased power in relation to a maximum power intended to be used by the power sourcing equipment operating under the power over ethernet standard and of whether the power sourcing equipment is of a power sourcing equipment type able to deliver increased power;
physically manipulating the current-sensing device such that it senses a manipulated lower loop current by, in case the loop current is measured using the first shunt resistance, activating the manipulation, and in case the loop current is measured using the inductive circuit, manipulating the inductive circuit by increasing a number of windings in the inductive circuit;
wherein the power sourcing equipment is configured to provide a manipulated higher output power from the power sourcing equipment to the powered device if the powered device needs increased power and the power sourcing equipment is of a power sourcing equipment type able to deliver increased power.

9. The power sourcing equipment according to claim 8, comprising a switch element, wherein the switch element can be closed to connect to the manipulation shunt resistor when increased power is delivered, and wherein the switch element is open during the power negotiation.

10. The system according to claim 9, wherein the powered device is a camera, a LIDAR, a speaker or a radar.

* * * * *